United States Patent
Sood et al.

(10) Patent No.: US 9,705,849 B2
(45) Date of Patent: Jul. 11, 2017

(54) TECHNOLOGIES FOR DISTRIBUTED DETECTION OF SECURITY ANOMALIES

(71) Applicants: Kapil Sood, Beaverton, OR (US); Mesut A. Ergin, Portland, OR (US); John R. Fastabend, Hillsboro, OR (US); Shinae Woo, Portland, OR (US); Jeffrey B. Shaw, Tempe, AZ (US); Brian J. Skerry, Gilbert, AZ (US)

(72) Inventors: Kapil Sood, Beaverton, OR (US); Mesut A. Ergin, Portland, OR (US); John R. Fastabend, Hillsboro, OR (US); Shinae Woo, Portland, OR (US); Jeffrey B. Shaw, Tempe, AZ (US); Brian J. Skerry, Gilbert, AZ (US)

(73) Assignee: Intel Corporation, Santa Clara, CA (US)

( * ) Notice: Subject to any disclaimer, the term of this patent is extended or adjusted under 35 U.S.C. 154(b) by 31 days.

(21) Appl. No.: 14/513,140

(22) Filed: Oct. 13, 2014

(65) Prior Publication Data

US 2016/0094573 A1 Mar. 31, 2016

Related U.S. Application Data

(60) Provisional application No. 62/058,096, filed on Sep. 30, 2014.

(51) Int. Cl.
*H04L 29/06* (2006.01)
*G06F 21/55* (2013.01)

(52) U.S. Cl.
CPC ........ *H04L 63/0272* (2013.01); *G06F 21/554* (2013.01); *H04L 63/1425* (2013.01);
(Continued)

(58) Field of Classification Search
CPC ............. H04L 63/1425; H04L 63/0272; H04L 63/0823; H04L 63/1433; H04L 63/20;
(Continued)

(56) References Cited

U.S. PATENT DOCUMENTS 7,096,502 B1 * 8/2006 Fox ......................... H04L 41/28
707/999.008
8,087,067 B2 * 12/2011 Mahaffey ................ G06F 21/30
726/23

(Continued)

OTHER PUBLICATIONS

"Host Embedded Controller Interface," http://en.wikipedia.org/wiki/Host_Embedded_Controller_Interface, printed Oct. 31, 2014, 3 pages.
(Continued)

*Primary Examiner* — Sarah Su

(74) *Attorney, Agent, or Firm* — Barnes & Thornburg LLP

(57) ABSTRACT

Technologies for distributed detection of security anomalies include a computing device to establish a trusted relationship with a security server. The computing device reads one or more packets of at least one of an inter-virtual network function network or an inter-virtual network function component network in response to establishing the trusted relationship and performs a security threat assessment of the one or more packets. The computing device transmits the security threat assessment to the security server.

25 Claims, 7 Drawing Sheets

(52) U.S. Cl.
CPC .......... *H04L 63/1433* (2013.01); *H04L 63/20* (2013.01); *H04L 63/061* (2013.01)

(58) Field of Classification Search
CPC ... H04L 63/061; G06F 21/6227; G06F 21/554
USPC ................. 713/156, 155; 726/22, 23, 24, 25
See application file for complete search history.

(56) References Cited

U.S. PATENT DOCUMENTS

| | | | | |
|---|---|---|---|---|
| 9,161,249 | B1* | 10/2015 | Leita ..................... | H04W 24/08 |
| 2004/0081152 | A1* | 4/2004 | Thubert .................. | H04L 45/04 370/392 |
| 2004/0215972 | A1* | 10/2004 | Sung ................... | H04L 63/1408 726/23 |
| 2007/0277240 | A1* | 11/2007 | Durfee .................. | G06F 21/577 726/24 |
| 2007/0297430 | A1* | 12/2007 | Nykanen ............... | H04L 63/029 370/408 |
| 2009/0307753 | A1* | 12/2009 | Dupont ............... | H04L 12/2872 726/3 |
| 2011/0041003 | A1* | 2/2011 | Pattar ................... | H04W 12/10 714/4.3 |
| 2011/0209196 | A1* | 8/2011 | Kennedy ................. | G06F 21/55 726/1 |
| 2012/0017270 | A1* | 1/2012 | Bartholomay ...... | H04L 41/5041 726/13 |
| 2012/0023572 | A1* | 1/2012 | Williams, Jr. ........ | G06F 21/552 726/13 |
| 2012/0210113 | A1* | 8/2012 | Wood ..................... | G06F 21/575 713/2 |
| 2012/0272289 | A1* | 10/2012 | Chang ................. | H04L 67/2838 726/1 |
| 2013/0044084 | A1* | 2/2013 | Hendry .................... | G06F 21/84 345/204 |
| 2014/0270177 | A1* | 9/2014 | Brickell ................ | H04L 9/0877 380/278 |
| 2015/0006968 | A1* | 1/2015 | ShanBhogue ....... | G06F 11/0727 714/42 |
| 2015/0199514 | A1* | 7/2015 | Tosa ...................... | G06F 21/554 726/17 |
| 2016/0057208 | A1* | 2/2016 | Parikh .................... | H04L 67/10 714/4.11 |
| 2016/0062781 | A1* | 3/2016 | Tsirkin ................. | G06F 9/4843 718/1 |
| 2016/0226913 | A1* | 8/2016 | Sood ....................... | H04L 63/20 |
| 2016/0337329 | A1* | 11/2016 | Sood ....................... | H04L 63/08 |
| 2016/0373474 | A1* | 12/2016 | Sood ................... | H04L 63/1425 |

OTHER PUBLICATIONS

"Backhaul (telecommunications)," http://en.wikipedia.org/wiki/Backhaul_(telecommunications), printed Oct. 31, 2014, 5 pages.
"Hypervisor," http://en.wikipedia.org/wiki/Hypervisor, printed Oct. 31, 2014, 7 pages.
"Open vSwitch," http://en.wikipedia.org/wiki/Open_vSwitch, printed Oct. 31, 2014, 4 pages.
International Search Report and Written Opinion for International Application No. PCT/US2015/046909, dated Dec. 4, 2015, 13 pages.

* cited by examiner

TECHNOLOGIES FOR DISTRIBUTED DETECTION OF SECURITY ANOMALIES

CROSS-REFERENCE TO RELATED U.S. PATENT APPLICATION

The present application claims priority under 35 U.S.C. §119(e) to U.S. Provisional Application Ser. No. 62/058,096, entitled "TECHNOLOGIES FOR DISTRIBUTED DETECTION OF SECURITY ANOMOLIES," which was filed on Sep. 30, 2014.

BACKGROUND

Various technical specifications define the way in which network functions and services are deployed and managed by network operators and service providers worldwide. For example, specifications define the use of virtualized platforms to deliver services and, oftentimes, components within a service may be "chained" together. Such technical specifications include, for example, the European Telecommunication Standards Institute's standard for Network Functions Virtualization (ETSI NFV). When a network operator runs the network functions and services on a virtual network function model as currently defined by ETSI NFV, well-defined interfaces traditionally available to physical networking systems are no longer available for inter-flow packet analysis. As such, the system's ability to ensure threats are detected and responded to (e.g., preventing a subscriber from accessing a service on a network function reserved for subscribers with a higher privilege level) may be significantly inhibited.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
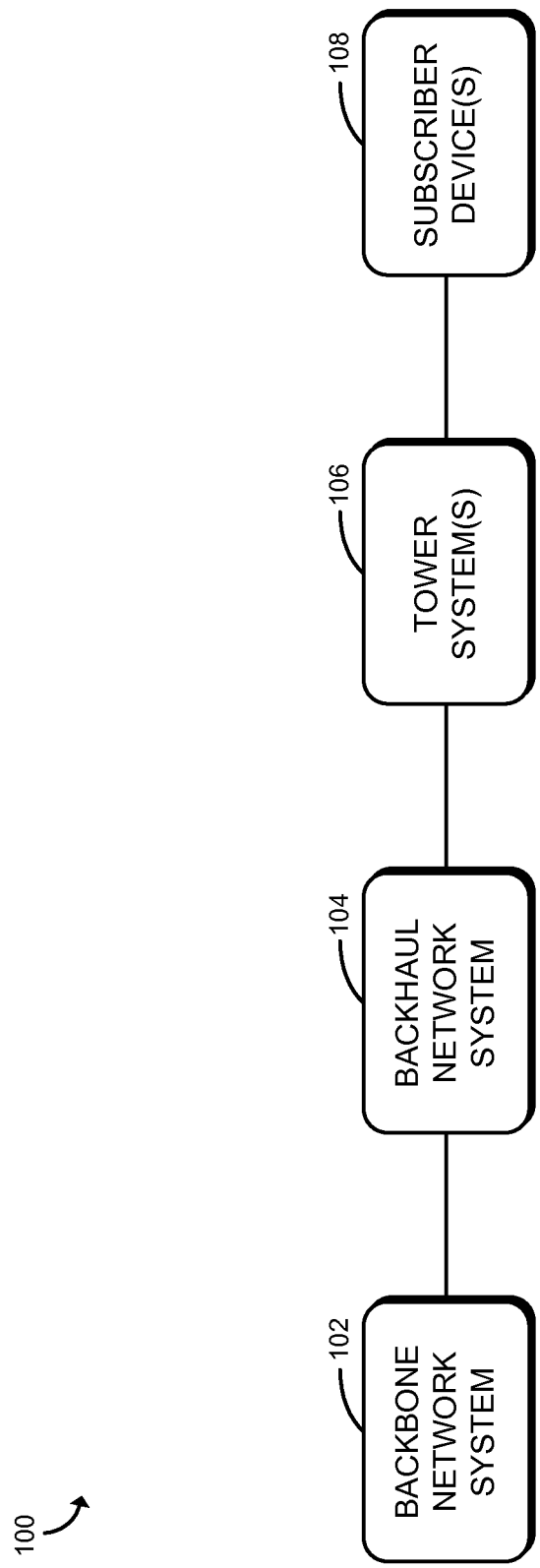
FIG. 1 is a simplified block diagram of at least one embodiment of a system for distributed detection of security anomalies.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C); (A and B); (B and C); (A and C); or (A, B, and C). Similarly, items listed in the form of "at least one of A, B, or C" can mean (A); (B); (C): (A and B); (B and C); (A and C); or (A, B, and C).

The disclosed embodiments may be implemented, in some cases, in hardware, firmware, software, or any combination thereof. The disclosed embodiments may also be implemented as instructions carried by or stored on one or more transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, a system 100 for distributed detection of security anomalies illustratively includes a backbone network system 102, a backhaul network system 104, one or more tower systems 106, and one or more subscriber devices 108. In the illustrative embodiment, the subscriber devices 108 communicate with the backhaul network system 104 by virtue of the tower systems 106, and the backhaul network system 104 ensures the appropriate data packets are routed to the backbone network system 102 for processing and/or further routing. It should be appreciated that each of the backbone network system 102, the backhaul network system 104, the tower systems 106, and the subscriber devices 108 may be embodied as any suitable device or collection of devices for performing the functions described herein. In the illustrative embodiment, each of the backbone network system 102, the backhaul network system 104, and the tower systems 106 enable telecommunication between the subscriber devices 108 and/or other devices (e.g., over the Internet). Further the backbone network system 102, the backhaul network system 104, and the tower systems 106 may include any number of devices, networks, routers, switches, computers, and/or other intervening devices to facilitate their corresponding functions depending on the particular implementation.

In some embodiments, the backbone network system 102 may be embodied as a Network Function Virtualization (NFV)-based Long-Term Evolution (LTE) backbone network having a Virtual Evolved Packet Core (vEPC) architecture. It should be appreciated that the backbone network system 102 may serve as a centralized network and, in some embodiments, may be communicatively coupled to another network (e.g., the Internet). In the illustrative embodiment, the backhaul network system 104 includes one or more devices that communicatively couple (e.g., via intermediate links) the backbone network system 102 to the tower systems 106, subnetworks, and/or edge networks. In some embodiments, the backhaul network system 104 may be embodied as an LTE backhaul network system and may include a variety of networks including, for example, T1, IP, optical, ATM, leased, and/or other networks.

The tower systems 106 include hardware configured to permit communication devices, for example, mobile computing devices (e.g., mobile phones) and/or other subscriber devices 108, to communicate with one another and/or other remote devices. In doing so, the tower systems 106 enable the subscriber devices 108 to communicate with the backhaul network system 104. In some embodiments, one or more of tower systems 106 may include or otherwise be embodied as an evolved node (eNodeB) configured to communicate directly or indirectly with one or more of the subscriber devices 108 (e.g., mobile computing device handsets). Further, the tower systems 106 may include or serve as, for example, a base transceiver station (BTS) or another station/system depending on the particular embodiment. The subscriber devices 108 may be embodied as any type of computing device capable of performing the functions described herein. For example, in embodiments in which an LTE backhaul and backbone system are utilized, the subscriber devices 108 may be embodied as mobile computing devices (e.g., smartphones) and may be configured to utilize a cellular network.

As described in detail below, the system 100 may utilize various virtual network functions while ensuring that threats are detected and acted upon (e.g., via inter-flow packet analysis). Additionally, the system 100 may provide enhanced and fine-grain security inspection capabilities on virtual platforms using a Trusted Execution Environment (TEE). As described below, in the illustrative embodiment, the TEE is established as a secure enclave such as Intel® Software Guard Extensions (SGX). However, in other embodiments, the TEE may be otherwise established or embodied as, for example, a Manageability Engine (ME), trusted platform module (TPM), Innovation Engine (IE), secure partition, separate processor core, and/or otherwise established.

It should be appreciated that in a Network Function Virtualization (NVF) environment, the traditional well-defined interfaces of non-virtualized environments are generally unavailable and the NFV system may include multiple Virtual Network Functions (VNFs), each of which may include one or more Virtual Network Function Components (VNFCs). The VNFs and/or VNFCs may communicate with one another using various different mechanisms including, for example, shared memory, OS- or Hypervisor-specific Application Programming Interfaces (APIs) that are closed, network virtual switch test access points (TAPs), and/or other mechanisms. Further, in some embodiments, the intra-VNF and/or intra-VNF traffic may be encrypted using, for example, Internet Protocol security (IPsec) or Secure Sockets Layer (SSL). As such, it should be appreciated that, the traditional mechanisms may not offer a consistent way for a traditional Network Inspection System to operate efficiently with clear visibility to all traffic in a virtualized environment.

However, in the illustrative embodiment, the system 100 is configured to inspect packets and/or flows across virtualized systems using the capability of the TEE (e.g., in conjunction with microcode (ucode), hardware instructions, and/or other mechanisms). For example, as described below, each server or platform of the system 100 may include a platform-specific TEE that assumes the role of platform security policy inspector. In particular, the platform-specific TEE may inspect all packets coming (i.e., ingress and/or egress) from the Network MAC/Ethernet and/or other network/communication interfaces (e.g., through inter-IP side-channel mechanisms). Additionally, the platform-specific TEE may inspect shared memory and/or proprietary APIs based on hypervisor (e.g., virtual machine monitor) privileges and communication with the TEE using defined APIs (e.g., a HECI interface). The platform-specific TEE may, additionally or alternatively, inspect local and shared processor (e.g., CPU) and SoC cache memory based on higher privileges invoked on signed and anti-rollback protected microcode (ucode) patches. In some embodiments, the platform-specific TEE uses the TEE-based inter-VNFC tunnel keys for monitoring protected inter-VNFC and inter-VNF traffic. Additionally or alternatively, the platform-specific TEE may use hypervisor access into the various virtual switch interfaces and into TAPs to access traffic data.

It should be appreciated that, in some embodiments, the TEE may collect information from multiple sources on the platform and may do so in a far more detailed manner than done in traditional systems. For example, the TEE may be configurable by a policy to monitor all or selected packets, network flows, track packet modifications, and/or perform other monitoring functions. The TEE may run advanced heuristics on the data collected and, depending on the particular policy, retain threat information. Further, the TEE may take one or more remedial actions based on the policy and/or received remediation instructions (e.g., blocking certain flows, copying packets, etc.). In some embodiments, the TEE may convey exceptions and/or threat heuristics to a nominated TEE (e.g., on an NFV distributed threat detection security system), which may execute system-wide security threat heuristics/analysis. It should be appreciated that, in some embodiments, the TEE is "nominated" in the sense that the distributed threat detection system is designed such that other TEEs transmit security information to the nominated TEE for further (e.g., wider-scale) analysis. As described below, in some embodiments, the nominated TEE may be included in a security server and/or a distributed threat detection security system. Further, in some embodiments, multiple TEEs may be nominated to perform a system-wide or subsystem-wide security threat analysis, and the TEEs may be arranged hierarchically. For example, in an embodiment, a first nominated TEE may perform a security threat analysis of a first subsystem based on information received from corresponding TEEs of servers in the first subsystem, and a second nominated TEE may perform a security threat analysis of a second subsystem based on information received from corresponding TEEs of servers in the second subsystem, and so on. Each of those subsystem TEEs (e.g., the first and second nominated TEEs) may provide their analyses and/or additional information to another nominated TEE at a "higher" hierarchical level to perform a full system-wide (or larger subsystem-wide) security threat analysis based on the information received from the lower level nominated TEEs. Of course, the number of nominated TEEs and/or hierarchical levels may vary depending on the particular embodiment.

It should be appreciated that the hierarchical ability of the TEE may allow a local remediation action to be enacted and simultaneously enable system-wide threat detection and remediation for flows that span VNFs and VNFCs across multiple platforms. In some embodiments, the TEE may be protected, including all code and data, and loaded only upon signature verification and measurements (e.g., using a TPM or virtual TPM). Further, the TEE may have the ability to run signature-verified third party verification (TPV) code authorized by the root keys for enabling TPVs and/or other vendors. It should be appreciated that the interfaces for communication described herein may include, for example, inter-IP communication (IPC) within a SoC or processor), device-driver model (e.g., HECI interface), virtual LAN attachment, existing protocols for inter-component interaction (e.g., PECI, SMBUS, etc.). In other embodiments, the components may communication over, for example, TLS-protected HTTPS web-based REST APIs. It should further be appreciated that, in some embodiments, the system 100 may be implemented in a platform-, hypervisor-, and cloud OS-neutral manner.

Figure 2:
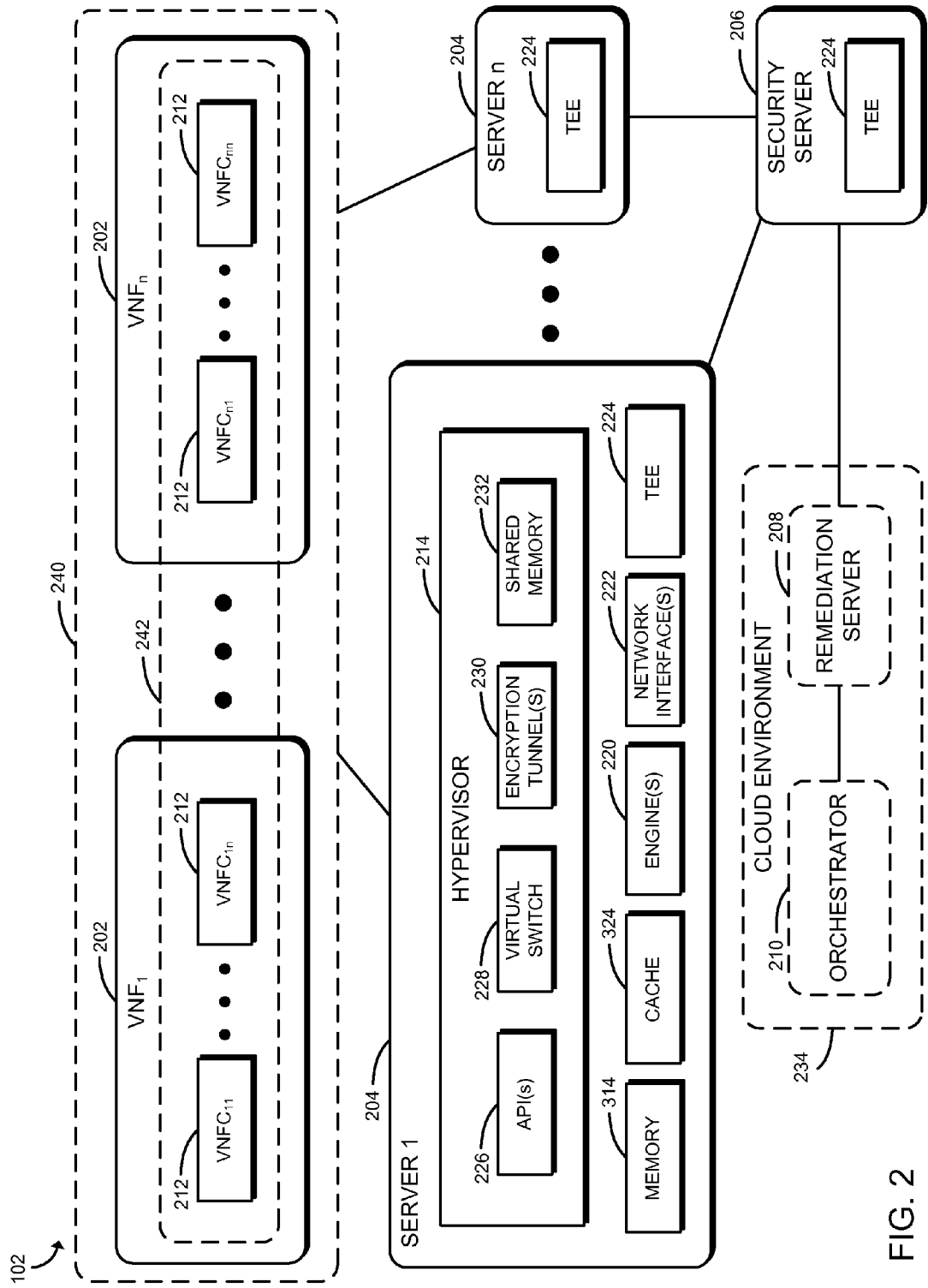
FIG. 2 is a simplified block diagram of at least one embodiment of a backbone network system of the system of FIG. 1.

Referring now to FIG. 2, in the illustrative embodiment, the backbone network system 102 includes one or more VNFs 202, one or more servers 204, and a security server 206. Additionally, in some embodiments, the backbone network system 102 includes a remediation server 208 and/or an orchestrator 210. Although only one security server 206, one remediation server 208, and one orchestrator 210 are illustratively shown in FIG. 2, the backbone network system 102 may include any number of security servers 206, remediation servers 208, and/or orchestrators 210 in other embodiments. For example, several security servers 206 may be included, each of which may include a nominated TEE as described herein for hierarchical and distributed threat detection. It should be appreciated that, in some embodiments, each of the servers 204 and the security server 206 may include similar hardware, software, and/or firmware components. Further, in some embodiments, the security server 206 may be embodied as one of the servers 204 except that the security server 206 includes a nominated TEE as described herein.

Figure 3:
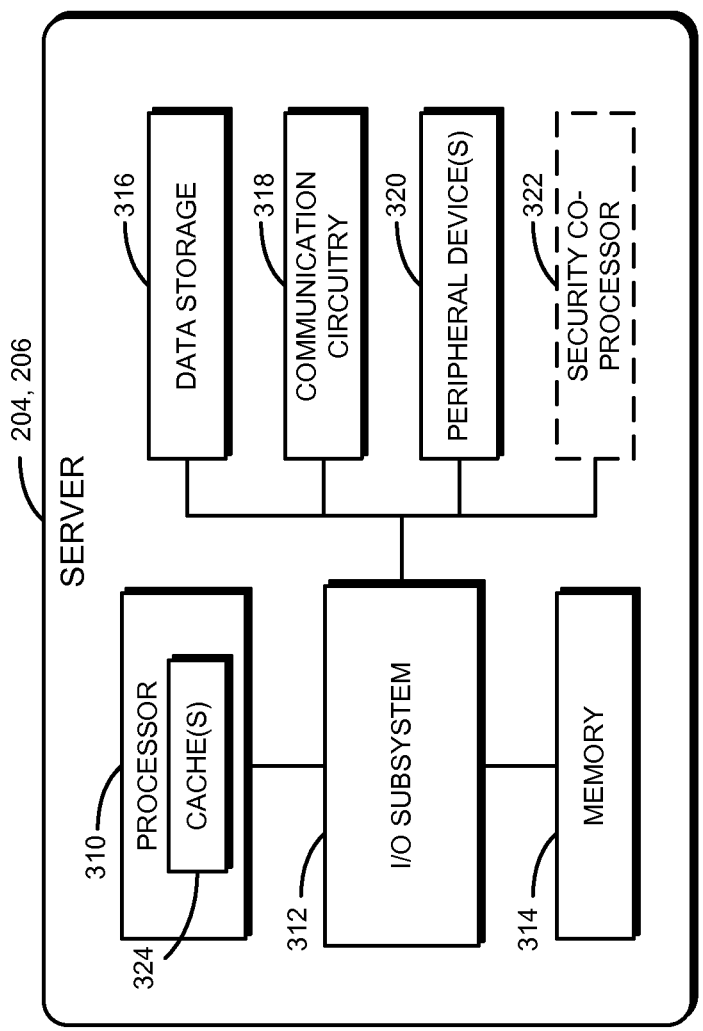
FIG. 3 is a simplified block diagram of at least one embodiment of a server of the backbone network system of FIG. 2.

Referring now to FIG. 3, an illustrative embodiment of the servers 204, 206 of the system 102 is shown. As shown, the illustrative server 204, 206 includes a processor 310, an input/output ("I/O" subsystem) 312, a memory 314, a data storage 316, a communication circuitry 318, and one or more peripheral devices 320. Additionally, in some embodiments, the server 204, 206 may include a security co-processor 322. Of course, the server 204, 206 may include other or additional components, such as those commonly found in a typical computing device (e.g., various input/output devices and/or other components), in other embodiments. Additionally, in some embodiments, one or more of the illustrative components may be incorporated in, or otherwise form a portion of, another component. For example, the memory 314, or portions thereof, may be incorporated in the processor 310 in some embodiments.

The processor 310 may be embodied as any type of processor capable of performing the functions described herein. For example, the processor 310 may be embodied as a single or multi-core processor(s), digital signal processor, microcontroller, or other processor or processing/controlling circuit. As shown, the processor 310 may include one or more cache memories 324. It should be appreciated that the memory 314 may be embodied as any type of volatile or non-volatile memory or data storage capable of performing the functions described herein. In operation, the memory 314 may store various data and software used during operation of the server 204, 206 such as operating systems, applications, programs, libraries, and drivers. The memory 314 is communicatively coupled to the processor 310 via the I/O subsystem 312, which may be embodied as circuitry and/or components to facilitate input/output operations with the processor 310, the memory 314, and other components of the server 204, 206. For example, the I/O subsystem 312 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 312 may form a portion of a system-on-a-chip (SoC) and be incorporated, along with the processor 310, the memory 314, and other components of the server 204, 206, on a single integrated circuit chip.

The data storage 316 may be embodied as any type of device or devices configured for short-term or long-term storage of data such as, for example, memory devices and circuits, memory cards, hard disk drives, solid-state drives, or other data storage devices. The data storage 316 and/or the memory 314 may store various data during operation of the server 204, 206 useful for performing the functions described herein.

The communication circuitry 318 may be embodied as any communication circuit, device, or collection thereof, capable of enabling communications between the server 204, 206 and other remote devices over a network. The communication circuitry 318 may be configured to use any one or more communication technologies (e.g., wireless or wired communications) and associated protocols (e.g., Ethernet, Bluetooth®, Wi-Fi®, WiMAX, etc.) to effect such communication. In some embodiments, the communication circuitry 318 includes cellular communication circuitry and/or other long-ranged wireless communication circuitry.

The peripheral devices 320 may include any number of additional peripheral or interface devices, such as speakers, microphones, additional storage devices, and so forth. The particular devices included in the peripheral devices 320 may depend on, for example, the type and/or intended use of the server 204, 206.

The security co-processor 322, if included, may be embodied as any hardware component(s) or circuitry capable of performing security functions, cryptographic functions, and/or establishing a trusted execution environment. For example, in some embodiments, the security co-processor 322 may be embodied as a trusted platform module (TPM) or an out-of-band processor. Additionally, in some embodiments, the security co-processor 322 may establish an out-of-band communication link with remote devices (e.g., corresponding security co-processors 322 of other servers 204, 206).

Referring back to FIG. 2, as shown, the backbone network system 102 includes one or more virtual network functions (VNFs) 202, each of which may include one or more virtual network function components (VNFCs) 212. It should be appreciated that the VNFs 202 may be embodied as any suitable virtual network functions; similarly, the VNFCs 212 may be embodied as any suitable VNF components. For example, in some embodiments, the VNFs 202 may include a security gateway (SGW), a packet data network gateway (PNG), a billing function, and/or other virtual network functions. In some embodiments, a particular VNF 202 may have multiple sub-instances, which could be executing on the same server 204, 206 or different servers 204, 206. In other words, when virtualized, network functions traditionally handled by physical hardware co-located with a particular server 204, 206 may be distributed as VNFs 202 across one or more of the servers 204, 206. In the illustrative embodiment, the VNFCs 212 are processes and/or instances that cooperate to deliver the functionality of one or more VNFs 202. For example, in some embodiments, the VNFCs 212 are sub-modules of the VNFs 202. Similar to the VNFs 202, it should be appreciated that the VNFCs 212 may be distributed across one or more servers 204, 206. Further, it should be appreciated that a particular VNFC 212 may be distributed across multiple servers 204, 206 and still form a part of a VNF 202 established on a single server 204, 206.

As described herein, in the illustrative embodiment, the VNFs 202 of one or more servers 204, 206 may communicate with one another, for example, over an inter-VNF communication network 240 via one or more inter-VNF communication mechanisms. Similarly, the VNFCs 212 of one or more servers 204, 206 may communicate with one another, for example, over an inter-VNFC communication network 242 via one or more inter-VNFC communication mechanisms. It should be appreciated that the inter-VNF and inter-VNFC communication mechanisms may be embodied as any suitable mechanisms configured to enable inter-VNF and/or inter-VNFC communication. For example, in some embodiments, the VNFs 202 and/or VNFCs 212 may communicate with one another using an open switch with a hypervisor and packet parsing, formatted packets based on a standard format, shared memory (e.g., physical/virtual memory reserved by the hypervisor), and/or other suitable mechanisms. In the illustrative embodiment, the TEE of the server 204, 206 on which a particular VNF 202 or VNFC 212 is executing is configured to read (directly or indirectly) inter-VNF and inter-VNFC communication associated with the particular VNF 202 or VNFC 212.

It should be appreciated that the VNFs 202 may process packets into a service chain. However, during operation, one or more runtime threats may be injected into the system, which may circumvent a set of packets or flows from being processed by the entire service chain as required by a particular policy. As such, the TEE of the server 204, 206 may be utilized to identify such anomalies and abnormal VNF runtime behavior including, for example, malicious TCP sync floods, packet drops, flow disconnections, violation of application-level policies, and other potential security threats. As such, the TEE may assume a role as the server's security policy inspector.

In the illustrative embodiment of FIG. 2, each of the servers 204 includes a hypervisor 214, a memory 314, a cache 324, one or more engines 220, one or more network interfaces 222, and a trusted execution environment 224. Additionally, the hypervisor 214 includes one or more APIs 226, a virtual switch (vSwitch) 228, one or more encryption tunnels 230, and a shared memory 232. Of course, the servers 204 may include additional components in some embodiments, which are omitted for clarity of the description.

The hypervisor 214 or virtual machine monitor runs one or more virtual machines (VMs) on the corresponding server 204. As such, the hypervisor 214 may establish and/or utilize various virtualized hardware resources (e.g., virtual memory, virtual operating systems, virtual networking components, etc.). The particular APIs 226 included in the hypervisor 214 and/or the server 204 generally may vary depending on the particular server 204. In some embodiments, the APIs 226 include one or more proprietary APIs. In some embodiments, the APIs 226 may provide access to packets (e.g., associated with a particular VNF 202) such that they may be analyzed by the TEE 224. The virtual switch 228 may be utilized to enforce network policies and/or enforce actions (e.g., drop packets, monitor flows, perform deep inspection, perform remediation actions, etc.). For example, the virtual switch 216 may permit the networking of virtual machines (VMs) in the system 102. As described below, in some embodiments, the server 204 may establish encryption tunnels 218 for secure communication (e.g., for communication with the security server 206, between VNFs 202, and/or between VNFCs 212). In some embodiments, the encryption tunnels 218 may be read by the TEE 224 of the server 204 (e.g., in encrypted form or in unencrypted form by virtue of access to the corresponding encryption keys). Additionally, in some embodiments, one or more VMs, VNFs 202, and/or VNFCs 212 may utilize the shared memory 232. For example, in some embodiments, the VNFs 202 and VNFCs 212 may utilize the shared memory 232 to communicate with one another. It should be appreciated that the shared memory 232 may include physical memory and/or virtual memory depending on the particular embodiment. In the illustrative embodiment, the TEE 224 of a particular server 204 may access each of the APIs 226, the virtual switch 228, the encryption tunnels 230, and the shared memory 232 of that server 204 to retrieve data for a security threat analysis of one or more packets/flows. Additionally, the TEE 224 may access the inter-VNF and inter-VNFC communications for such an analysis.

As described above, the server 204 includes the memory 314, the cache 324, the engines 220, the network interfaces 222, and the TEE 224. It should be appreciated that the memory 314 may be embodied as any type of volatile or non-volatile memory or data storage capable of performing the functions described herein. Further, in some embodiments, the memory 314 may include software-defined storage. The one or more engines 220 may embodied as any hardware, firmware, and/or software components that generate data useful to the TEE 224 and/or the security server 206 in preparing a security assessment. For example, the engines 220 may include a SoC, graphics engine, security engine, audio engine, cryptographic module, TPM, co-processor, communication link or channel, switch, and/or another engine configured to process or otherwise handle data. The network interfaces 222 may be embodied as any interface associated with networking processes of data packets. For example, in some embodiments, the network interfaces 222 include a Network MAC/Ethernet interface, a software-defined networking module, and/or another network interface.

As indicated above, in the illustrative embodiment, the TEE 224 is established as a secure enclave such as Intel® Software Guard Extensions (SGX). However, in other embodiments, the TEE 224 may be otherwise established, for example, as a Manageability Engine (ME), trusted platform module (TPM), Innovation Engine (IE), secure partition, separate processor core, and/or otherwise established. For example, in some embodiments, the TEE 224 may be embodied as or established by virtue of the security co-processor 322. As discussed herein, the TEE 224 is configured to retrieve data from the various components of the server 204, which may be used to perform a security analysis. In some embodiments, the TEE 224 may perform a local security analysis based on the retrieved data. Further, in the illustrative embodiment, the TEE 224 transmits the security threat assessment data (i.e., the collected data and/or analytic results) to a corresponding TEE 224 of the security server 206 (i.e., to the nominated TEE 224). It should be appreciated that, in the illustrative embodiment, the TEEs 224 may communicate with one another over an out-of-band communication network.

As discussed herein, the nominated TEE 224 of the security server 206 performs a system-wide (or larger sub-system-wide) security assessment. In some embodiments, the security server 206 may communicate with the remediation server 208 to request a remediation instruction (i.e., a suitable action to be performed by the server 204) associated with the security assessment. As shown in FIG. 2, the remediation server 208 may be included within a cloud computing environment 234 in which case the remediation server 208 may consult with the orchestrator 210 to determine an appropriate remediation action/instruction. The remediation server 208 and the orchestrator 210 may be embodied as any server or computing device capable of performing the functions described herein. Further, the remediation server 208 and the orchestrator 210 may include components similar to the components of the servers 204, 206 described above and/or components commonly found in a server such as a processor, memory, I/O subsystem, data storage, peripheral devices, and so forth, which are not illustrated in FIG. 2 for clarity of the description.

Figure 4:
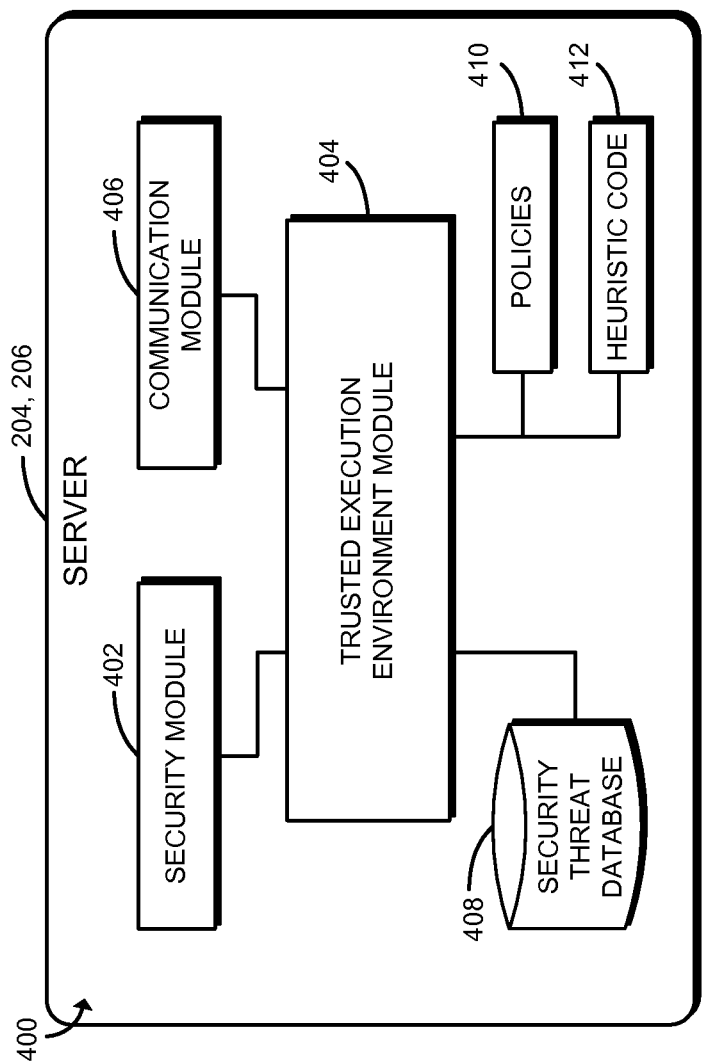
FIG. 4 is a simplified block diagram of at least one embodiment of an environment of the server of FIG. 3.

Referring now to FIG. 4, in use, one or more of the servers 204, 206 establishes an environment 400 for distributed detection of security anomalies. The illustrative environment 400 of the server 204, 206 includes a security module 402, a trusted execution environment module 404, a communication module 406, a security threat database 408, one or more policies 410 (e.g., security and/or configuration policies), and heuristic code 412. Each of the modules of the environment 400 may be embodied as hardware, software, firmware, or a combination thereof. Additionally, in some embodiments, one or more of the illustrative modules may form a portion of another module and/or one or more of the illustrative modules may be embodied as a standalone or independent module. For example, each of the modules, logic, and other components of the environment 400 may form a portion of, or otherwise be established by, the processor 310 of the server 204, 206.

The security module 402 is configured to perform various security functions for the server 206. For example, the security module 402 may handle the generation and verification of cryptographic keys, signatures, hashes, and/or perform other cryptographic functions.

The trusted execution environment module 404 establishes a trusted execution environment (e.g., the TEE 224) or otherwise secure environment within the server 204, 206. As described above, the TEE 224 may establish a trusted relationship with a corresponding TEE 224 of another server 204, 206. For example, in doing so, the TEEs 224 may perform a cryptographic key exchange. In some embodiments, the TEEs 224 may communicate with one another over established encrypted and/or otherwise secure tunnels. As described above, in some embodiments, the TEEs 224 may communicate with one another over an out-of-band communication channel (i.e., a communication channel separate from a common communication channel between the corresponding servers 204, 206). For example, the TEE 224 of one of the servers 204 may establish a trusted relationship with the TEE 224 of the security server 206. Further, as described above, the TEE 224 may read packets of VNFC-VNFC and VNF-VNF networks, retrieve data from the memory 314, the cache 324, the engines 220, and/or the network interfaces 222. Further, in some embodiments, the TEE module 404 reads fuses, the memory 314, the data storage 316, and/or other hardware components of the server 204, 206 to determine a particular policy 410 (e.g., a configuration or security policy) of the server 204, 206. Additionally, the TEE module 404 may perform a security assessment of one or more packets of the server 204, 206 based on the retrieved information to determine, for example, whether the packets pose a security threat. In doing so, the TEE module 404 may retrieve data from a security threat database 408 or otherwise correlate retrieved security threat assessment data with the security threat database 408. It should be appreciated that one of the servers 204 may perform a local security threat assessment and the security server 206 may perform a system-wide (or larger subsystem-wide) security threat assessment. As such, the security threat databases 408 of those servers 204, 206 may include corresponding data. In some embodiments, the TEE module 404 may utilize heuristic code 412 in assessing the security of one or more packets. In some embodiments, the heuristic code 412 identifies parameters and/or a context in which questionable instructions should be executed (e.g., in a VM or secure container). Additionally or alternatively, the heuristic code 412 may identify malicious code signatures, white lists, black lists, and/or otherwise include data useful by the TEE module in assessing the security of one or more packets/instructions.

The communication module 406 handles the communication between the server 204, 206 and remote devices through a suitable network. For example, as discussed above, the TEEs 224 of the servers 204, 206 may communicate with one another over an out-of-band communication channel or via encrypted tunnels.

Figure 5:
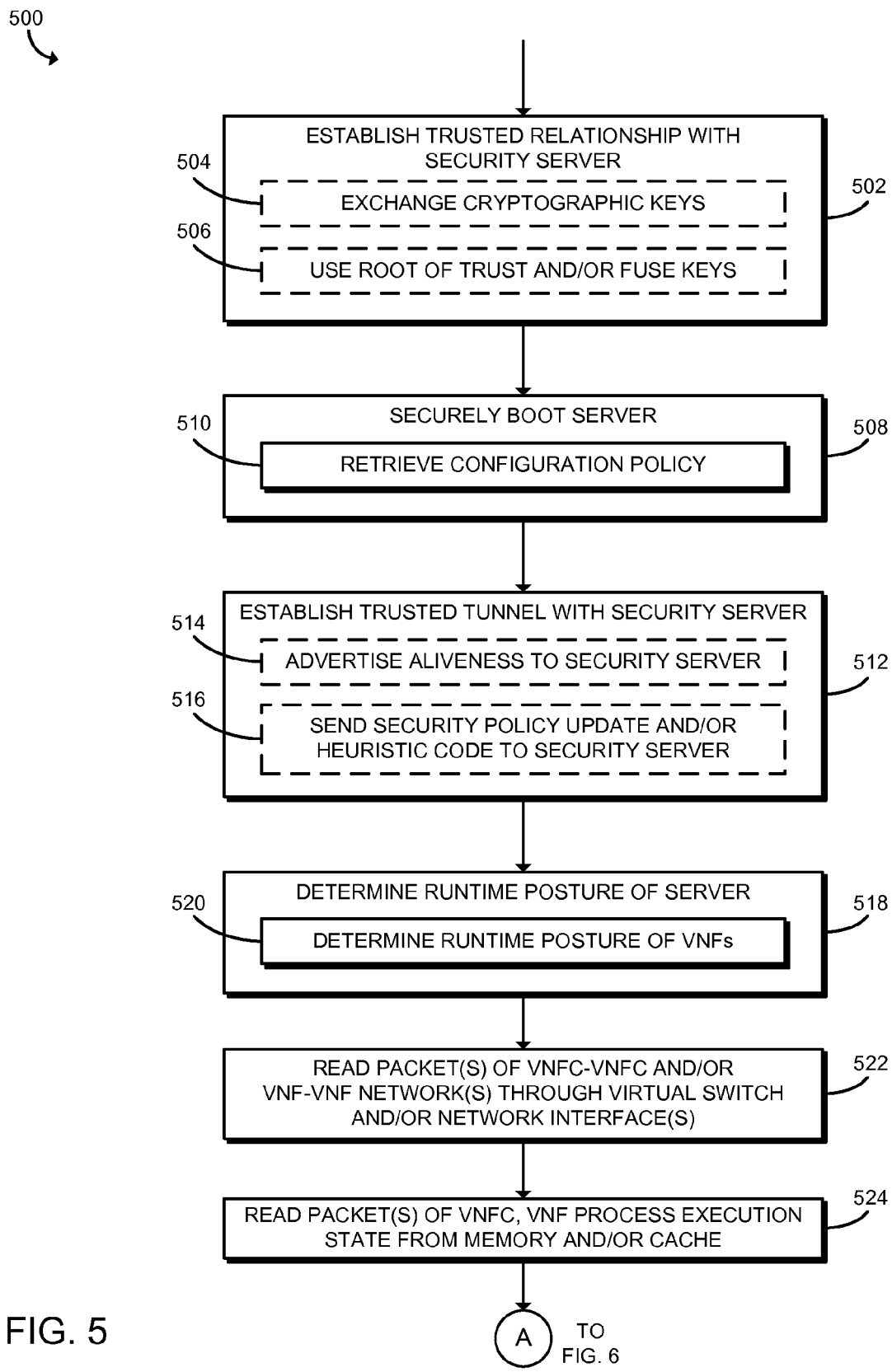
FIGS. 5-6 is a simplified flow diagram of at least one embodiment of a method for distributed detection of security anomalies that may be executed by a server of FIG. 2.
Figure 6:
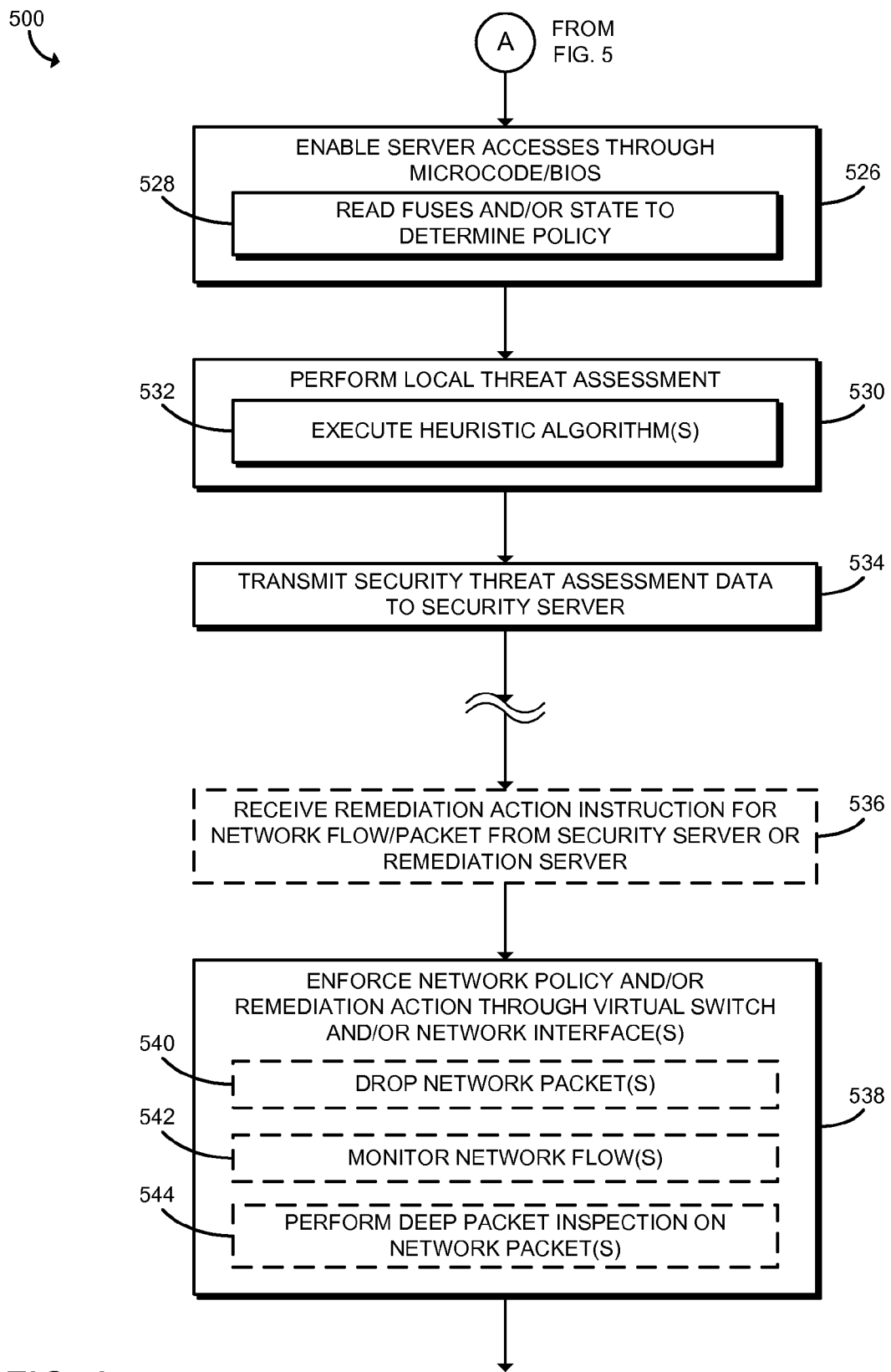

Referring now to FIGS. 5-6, in use, the server 204 may execute a method 500 for distributed detection of security anomalies. The illustrative method 500 begins with block 502 in which the server establishes a trusted relationship with the security server 206. As discussed above, in some embodiments, the security server 206 may be embodied as one of the servers 204 that includes a TEE 224 that has been selected or "nominated" to perform system-wide or subsystem-wide security analytics. In other embodiments, the security server 206 may be embodied as a server separate from the servers 204. It should be appreciated that, in establishing the trusted relationship, the server 204 may exchange cryptographic keys with the security server 206 in block 504 and/or may use a root of trust and/or fuse keys in block 506. For example, the server 204 and/or the security server 206 may include a cryptographic key or identification bound (e.g., cryptographically) to the server 204, 206 or, more particularly, a hardware component of the server 204, 206 (e.g., the security co-processor 322).

In block 508, the server 204 securely boots. In doing so, the server 204 retrieves its configuration policy in block 510 (e.g., from secure non-volatile memory of the server 204). In some embodiments, the configuration policy may indicate the execution parameters, contextual information, and/or other information associated with the operation of the server 204. For example, in some embodiments, the configuration policy may be utilized to notify the TEE 224 regarding various hardware, firmware, and/or software components of the server 204.

In block 512, the server 204 establishes a trusted tunnel with the security server 206. In doing so, the server 204 may advertise its aliveness in block 514. To do so, the server 204 may communicate with the security server 206 to inform the security server 206 that the server 204 is operational. For example, the server 204 may transmit a heartbeat signal to the security server 206. Further, in some embodiments, the server 204 may periodically or continuously advertise its aliveness. Additionally or alternatively, the server 204 may transmit its security policy and/or heuristic code (e.g., for use in applying a heuristic security algorithm to analyze packet data) to the security server 206 in block 516. In some embodiments, the server 204 may transmit the entire security policy, whereas in other embodiments, the security server 206 may maintain security policies for various servers 204, so that the server 204 may just provide the security server 206 with recent updates to the security policy rather than the entire security policy. Further, in some embodiments, the security server 204 may transmit heuristic code to the server 204 for use in assessing security.

In block 518, the server 204 determines the runtime posture (e.g., contextual and/or state information) of the server 204. In doing so, in block 520, the server 204 may determine the runtime posture of one or more VNFs 202 of the server 204. For example, the server 204 may determine a current context of the server 204 as a function of the VNFs 202, the VNFCs 212, and/or VMs. In block 522, the server 204 reads one or more packets of the VNFC-VNFC and/or VNF-VNF networks through the hypervisor 214. In particular, the server 204 may read one or more packets of the VNFC-VNFC and/or VNF-VNF networks through the virtual switch 228 and/or the network interfaces 222. In block 524, the server 204 reads one or more packets associated with the VNFC and/or VNF process execution state from the memory 314, 232 and/or the cache 324 of the server 204. In block 526 of FIG. 6, the server 204 enables server accesses through microcode (ucode) and/or BIOS of the server 204. In doing so, in block 528, the server 204 may read fuses and/or a state of the server 204 to determine a policy (e.g., security policy) of the server 204.

In block 530, the server 204 may perform a local threat assessment of the server 204. It should be appreciated that the server 204 may utilize the policies, heuristic code, runtime posture, packets, and/or other information retrieved or otherwise accessible to the server 204. In some embodiments, the server 204 executes one or more heuristic algorithms to perform a security threat assessment. In block 534, the server 204 reports the security threat assessment data to the security server 206. In doing so, the server 204 may transmit the raw data collected by the server 204, the local security assessment data, and/or intermediate data generated by the server 204.

Depending on the particular embodiment, the server 204 may receive remediation action instructions for a network flow/packet from the security server 206 or the remediation server 208 in block 536. For example, as discussed herein, the security server 206 may perform a system-wide threat analysis and/or request assistance from the remediation server 208 to determine whether any particular remediation action should be performed by the server 204. If none, the server 204 may not receive a response from the security server 206 in some embodiments. Of course, in some embodiments, the server 204 may independently determine whether to perform a security remediation action. In block 538, the server 204 enforces the network policy and/or any remediation action. In some embodiments, the server 204 may do so by virtue of the virtual switch 228 and/or the network interfaces 222. The particular remediation actions may vary depending on the particular security threat and/or the particular embodiment. For example, in block 540, the server 204 may drop one or more network packets based on the remediation instruction. In block 542, the server 204 may monitor one or more network flows. For example, in some embodiments, the security server 206 or the remediation server 208 may instruct the server 204 to monitor a particular class of network flows that may pose a security risk based on the threat analysis. Further, in block 544, the server 204 may perform a deep packet inspection of one or more network packets based on the remediation instruction. Of course, the server 204 may perform a wide variety of other remediation actions depending on the particular embodiment.

Figure 7:
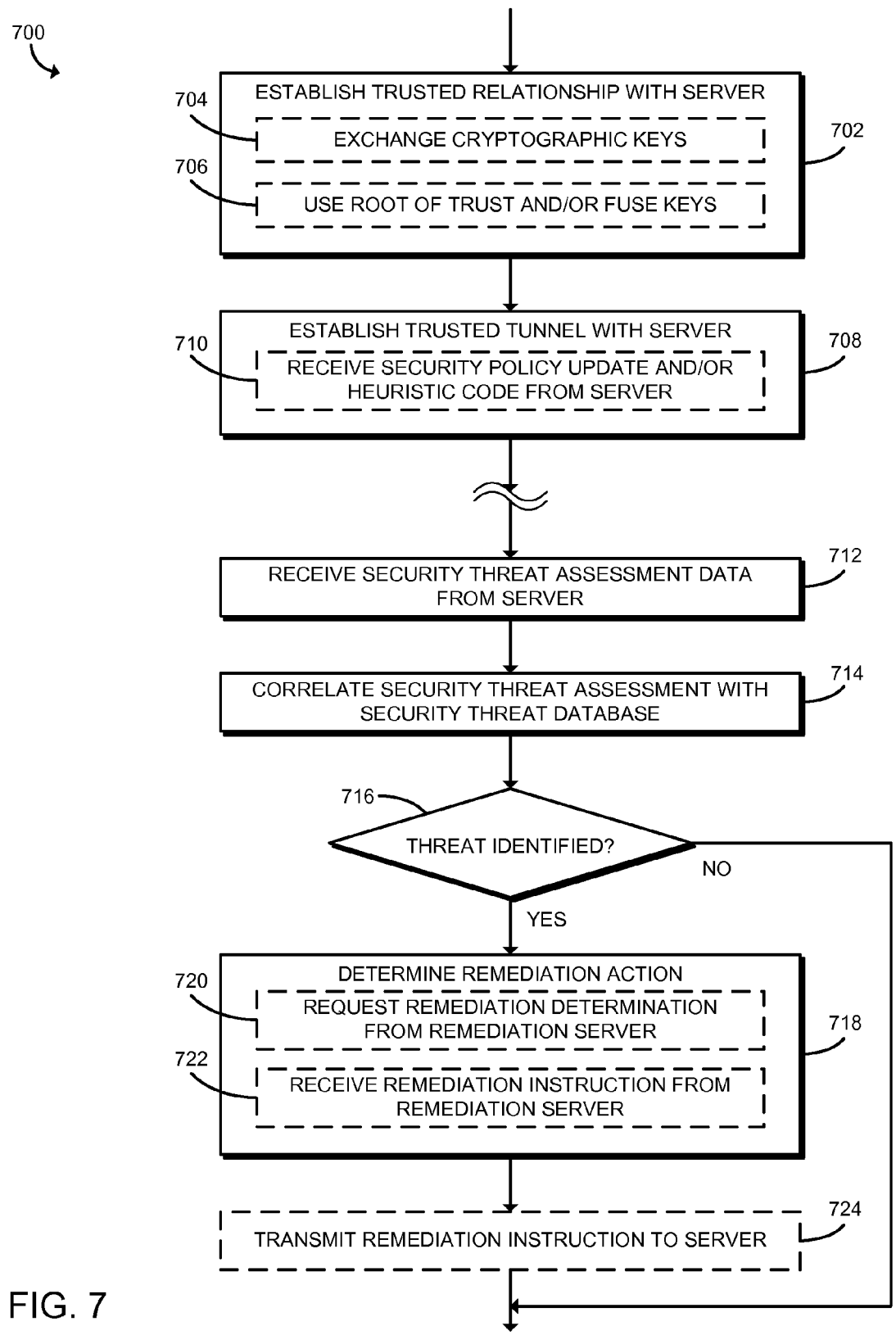
FIG. 7 is a simplified flow diagram of at least one embodiment of a method for distributed detection of security anomalies that may be executed by the security server of FIG. 2.

Referring now to FIG. 7, in use, the security server 206 may execute a method 700 distributed detection of security anomalies. The illustrative method 700 begins with block 702 of FIG. 7 in which the security server 206 establishes a trusted relationship one of the servers 204. As described above, in doing so, the security server 206 may perform a cryptographic key exchange with the server 204 in block 704 and/or utilize a root of trust and/or fuse key in block 706. For example, in embodiments in which bilateral trust is established, both the server 204 and the security server 206 includes a root of trust (e.g., a cryptographically bound key or identifier). In block 708, the security server 206 establishes trusted tunnel with the server 204 as described above. In doing so, the security server 206 may receive a security policy update and/or heuristics code from the server 204 in block 710. Additionally or alternatively, the security server 204 may transmit heuristic code to the server 204 (e.g., for use in assessing the security). Further, in block 712, the security server 206 receives security threat assessment data from the server 204 based on the received information. As discussed above, the server 204 may transmit the raw data collected by the server 204, the local security assessment data, and/or intermediate data generated by the server 204 to the security server 206 to enable the security server 206 to perform a system-wide or subsystem-wide security assessment.

In block 714, the security server 206 correlates the security threat assessment data with the security threat database 408 to determine whether the analyzed packet(s) pose a security threat to the server 204. In some embodiments, the security server 206 may simulate the execution of the packets (e.g., in a VM) based on the posture, security and configuration policies, context, heuristic code, and/or other information regarding the operations of the server 204. Additionally or alternatively, the security server 206 may compare the packets to various malware (e.g., virus) signatures, white lists, black lists, and/or other data to determine whether the packets are secure.

In block 716, the security server 206 determines whether a security threat has been identified. If so, the security server 206 determines a remediation action in block 718. To do so, in block 720, the security server 206 may request a remediation determination from the remediation server 208. In such embodiments, the remediation server 208 may perform a system-wide (e.g., cloud-based) security assessment and/or otherwise determine a remediation action to be performed by the server 204 to remedy or minimize damage associated with the security threat. As discussed above, in some embodiments, the remediation server 208 may cooperate with an orchestrator 210 in a cloud computing environment 234 to make such a determination. If a remediation server 208 is consulted, in block 722, the security server 206 may receive the corresponding remediation instructions from the remediation server 208. In other embodiments, the remediation server 208 may transmit the instructions directly to the server 204. Of course, in some embodiments, the security server 206 may perform the remediation analysis on its own. In block 724, the security server 206 may transmit a remediation instruction to the server 204.

EXAMPLES

Illustrative examples of the technologies disclosed herein are provided below. An embodiment of the technologies may include any one or more, and any combination of, the examples described below.

Example 1 includes a computing device for distributed detection of security anomalies, the computing device comprising a trusted execution environment module to (i) establish a trusted relationship with a security server, (ii) read one or more packets of at least one of an inter-virtual network function network or an inter-virtual network function component network in response to establishment of the trusted relationship, and (iii) perform a security threat assessment of the one or more packets; and a communication module to transmit the security threat assessment to the security server.

Example 2 includes the subject matter of Example 1, and wherein to establish the trusted relationship comprises to establish the trusted relationship with a corresponding trusted execution environment module of the security server.

Example 3 includes the subject matter of any of Examples 1 and 2, and wherein to transmit the security threat assessment comprises to transmit the security threat assessment to the corresponding trusted execution environment module of the security server over an out-of-band communication channel established between the trusted execution environment module of the computing device and the corresponding trusted execution environment module of the security server.

Example 4 includes the subject matter of any of Examples 1-3, and wherein to establish the trusted relationship comprises to exchange cryptographic keys with the security server.

Example 5 includes the subject matter of any of Examples 1-4, and wherein to establish the trusted relationship comprises to utilize at least one of a root of trust or a fuse key of the computing device.

Example 6 includes the subject matter of any of Examples 1-5, and wherein the trusted execution environment module is further to establish a trusted tunnel with the security server based on the trusted relationship.

Example 7 includes the subject matter of any of Examples 1-6, and wherein to establish the trusted tunnel further comprises to transmit a security policy of the computing device to the security server.

Example 8 includes the subject matter of any of Examples 1-7, and wherein to establish the trusted tunnel further comprises to transmit heuristic code of the computing device to the security server.

Example 9 includes the subject matter of any of Examples 1-8, and wherein to establish the trusted tunnel further comprises to receive heuristic code from the security server.

Example 10 includes the subject matter of any of Examples 1-9, and wherein the trusted execution environment module is further to boot the computing device in response to establishment of the trusted relationship.

Example 11 includes the subject matter of any of Examples 1-10, and wherein to boot the computing device comprises to retrieve a configuration policy of the computing device.

Example 12 includes the subject matter of any of Examples 1-11, and wherein the trusted execution environment module is further to determine a runtime posture of the computing device; and wherein to perform the security threat assessment comprises to perform the security threat assessment of the one or more packets based on the runtime posture.

Example 13 includes the subject matter of any of Examples 1-12, and wherein to determine the runtime posture of the computing device comprises to determine a runtime posture of a virtual network function of the computing device.

Example 14 includes the subject matter of any of Examples 1-13, and wherein the communication module is further to receive a remediation action instruction for the one or more packets from the security server.

Example 15 includes the subject matter of any of Examples 1-14, and wherein the trusted execution environment module is further to enforce a remediation action corresponding with the remediation action instruction.

Example 16 includes a method for distributed detection of security anomalies by a computing device, the method comprising establishing, by the computing device, a trusted relationship with a security server; reading, by the computing device, one or more packets of at least one of an inter-virtual network function network or an inter-virtual network function component network in response to establishing the trusted relationship; performing, by the computing device, a security threat assessment of the one or more packets; and transmitting, by the computing device, the security threat assessment to the security server.

Example 17 includes the subject matter of Example 16, and wherein establishing the trusted relationship comprises establishing the trusted relationship with a corresponding trusted execution environment module of the security server.

Example 18 includes the subject matter of any of Examples 16 and 17, and wherein transmitting the security threat assessment comprises transmitting the security threat assessment to the corresponding trusted execution environment module of the security server over an out-of-band communication channel established between the trusted execution environment module of the computing device and the corresponding trusted execution environment module of the security server.

Example 19 includes the subject matter of any of Examples 16-18, and wherein establishing the trusted relationship comprises exchanging cryptographic keys with the security server.

Example 20 includes the subject matter of any of Examples 16-19, and wherein establishing the trusted relationship comprises utilizing at least one of a root of trust or a fuse key of the computing device.

Example 21 includes the subject matter of any of Examples 16-20, and further including establishing, by the computing device, a trusted tunnel with the security server based on the trusted relationship.

Example 22 includes the subject matter of any of Examples 16-21, and wherein establishing the trusted tunnel comprises transmitting a security policy of the computing device to the security server.

Example 23 includes the subject matter of any of Examples 16-22, and wherein establishing the trusted tunnel comprises transmitting heuristic code of the computing device to the security server.

Example 24 includes the subject matter of any of Examples 16-23, and wherein establishing the trusted tunnel comprises receiving heuristic code from the security server.

Example 25 includes the subject matter of any of Examples 16-24 and further including booting the computing device in response to establishing the trusted relationship.

Example 26 includes the subject matter of any of Examples 16-25, and wherein booting the computing device comprises retrieving a configuration policy of the computing device.

Example 27 includes the subject matter of any of Examples 16-26, and further including determining, by the computing device, a runtime posture of the computing device; and wherein performing the security threat assessment comprises performing the security threat assessment of the one or more packets based on the runtime posture.

Example 28 includes the subject matter of any of Examples 16-27, and wherein determining the runtime posture of the computing device comprises determining a runtime posture of a virtual network function of the computing device.

Example 29 includes the subject matter of any of Examples 16-28, and further including receiving, by the computing device, a remediation action instruction for the one or more packets from the security server.

Example 30 includes the subject matter of any of Examples 16-29, and further including enforcing, by the computing device, a remediation action corresponding with the remediation action instruction.

Example 31 includes a computing device comprising a processor; and a memory having stored therein a plurality of instructions that when executed by the processor cause the computing device to perform the method of any of Examples 16-30.

Example 32 includes one or more machine-readable storage media comprising a plurality of instructions stored thereon that, in response to execution by a computing device, cause the computing device to perform the method of any of Examples 16-30.

Example 33 includes a computing device for distributed detection of security anomalies, the computing device comprising means for establishing a trusted relationship with a security server; means for reading one or more packets of at least one of an inter-virtual network function network or an inter-virtual network function component network in response to establishment of the trusted relationship; means for performing a security threat assessment of the one or more packets; and means for transmitting the security threat assessment to the security server.

Example 34 includes the subject matter of Example 33, and wherein the means for establishing the trusted relationship comprises means for establishing the trusted relationship with a corresponding trusted execution environment module of the security server.

Example 35 includes the subject matter of any of Examples 33 and 34, and wherein the means for transmitting the security threat assessment comprises means for transmitting the security threat assessment to the corresponding trusted execution environment module of the security server over an out-of-band communication channel established between the trusted execution environment module of the computing device and the corresponding trusted execution environment module of the security server.

Example 36 includes the subject matter of any of Examples 33-35, and wherein the means for establishing the trusted relationship comprises means for exchanging cryptographic keys with the security server.

Example 37 includes the subject matter of any of Examples 33-36, and wherein the means for establishing the trusted relationship comprises means for utilizing at least one of a root of trust or a fuse key of the computing device.

Example 38 includes the subject matter of any of Examples 33-37, and further including means for establishing a trusted tunnel with the security server based on the trusted relationship.

Example 39 includes the subject matter of any of Examples 33-38, and wherein the means for establishing the trusted tunnel comprises means for transmitting a security policy of the computing device to the security server.

Example 40 includes the subject matter of any of Examples 33-39, and wherein the means for establishing the trusted tunnel comprises means for transmitting heuristic code of the computing device to the security server.

Example 41 includes the subject matter of any of Examples 33-40, and wherein the means for establishing the trusted tunnel comprises means for receiving heuristic code from the security server.

Example 42 includes the subject matter of any of Examples 33-41, and further including means for booting the computing device in response to establishment of the trusted relationship.

Example 43 includes the subject matter of any of Examples 33-42, and wherein the means for booting the computing device comprises means for retrieving a configuration policy of the computing device.

Example 44 includes the subject matter of any of Examples 33-43, and further including means for determining a runtime posture of the computing device; and wherein the means for performing the security threat assessment comprises means for performing the security threat assessment of the one or more packets based on the runtime posture.

Example 45 includes the subject matter of any of Examples 33-44, and wherein the means for determining the runtime posture of the computing device comprises means for determining a runtime posture of a virtual network function of the computing device.

Example 46 includes the subject matter of any of Examples 33-45, and further including means for receiving a remediation action instruction for the one or more packets from the security server.

Example 47 includes the subject matter of any of Examples 33-46, and further including means for enforcing a remediation action corresponding with the remediation action instruction.

Example 48 includes a security server for distributed detection of security anomalies, the security server comprising a trusted execution environment module to establish a trusted relationship with a computing device; and a communication module to receive, from the computing device, a security threat assessment of one or more packets of at least one of an inter-virtual network function network or an inter-virtual network function component network of the computing device; wherein the trusted execution environment module is further to correlate the security threat assessment with a security threat database of the security server to determine whether the one or more packets pose a security threat.

Example 49 includes the subject matter of Example 48, and wherein to establish the trusted relationship comprises to establish the trusted relationship with a corresponding trusted execution environment module of the computing device.

Example 50 includes the subject matter of any of Examples 48 and 49, and wherein to receive the security threat assessment comprises to receive the security threat assessment from the corresponding trusted execution environment module of the computing device over an out-ofband communication channel established between the trusted execution environment module of the security server and the corresponding trusted execution environment module of the computing device.

Example 51 includes the subject matter of any of Examples 48-50, and wherein to establish the trusted relationship comprises to exchange cryptographic keys with the computing device.

Example 52 includes the subject matter of any of Examples 48-51, and wherein the trusted execution environment module is further to establish a trusted tunnel with the computing device based on the trusted relationship.

Example 53 includes the subject matter of any of Examples 48-52, and wherein to establish the trusted tunnel further comprises to receive a security policy of the computing device from the computing device.

Example 54 includes the subject matter of any of Examples 48-53, and wherein to establish the trusted tunnel further comprises to receive heuristic code of the computing device from the computing device.

Example 55 includes the subject matter of any of Examples 48-54, and wherein to establish the trusted tunnel further comprises to transmit heuristic code to the computing device.

Example 56 includes the subject matter of any of Examples 48-55, and wherein the trusted execution environment module is further to determine a remediation action in response to identification of a security threat based on correlation of the security threat assessment with the security threat database.

Example 57 includes the subject matter of any of Examples 48-56, and wherein to determine the remediation action comprises to request a remediation determination from a remediation server; and receive a remediation instruction associated with the remediation determination from the remediation server.

Example 58 includes the subject matter of any of Examples 48-57, and wherein the communication module is further to transmit the remediation instruction to the computing device.

Example 59 includes a method for distributed detection of security anomalies by a security server, the method comprising establishing, by the security server, a trusted relationship with a computing device; receiving, by the security server and from the computing device, a security threat assessment of one or more packets of at least one of an inter-virtual network function network or an inter-virtual network function component network of the computing device; and correlating, by the security server, the security threat assessment with a security threat database of the security server to determine whether the one or more packets pose a security threat.

Example 60 includes the subject matter of Example 59, and wherein establishing the trusted relationship comprises establishing the trusted relationship with a corresponding trusted execution environment module of the computing device.

Example 61 includes the subject matter of any of Examples 59 and 60, and wherein receiving the security threat assessment comprises receiving the security threat assessment from the corresponding trusted execution environment module of the computing device over an out-of-band communication channel established between the trusted execution environment module of the security server and the corresponding trusted execution environment module of the computing device.

Example 62 includes the subject matter of any of Examples 59-61, and wherein establishing the trusted relationship comprises exchanging cryptographic keys with the computing device.

Example 63 includes the subject matter of any of Examples 59-62, and further including establishing, by the security server, a trusted tunnel with the computing device based on the trusted relationship.

Example 64 includes the subject matter of any of Examples 59-63, and wherein establishing the trusted tunnel further comprises receiving a security policy of the computing device from the computing device.

Example 65 includes the subject matter of any of Examples 59-64, and wherein establishing the trusted tunnel further comprises receiving heuristic code of the computing device from the computing device.

Example 66 includes the subject matter of any of Examples 59-65, and wherein establishing the trusted tunnel further comprises transmitting heuristic code to the computing device.

Example 67 includes the subject matter of any of Examples 59-66, and further including determining, by the security server, a remediation action in response to identifying a security threat based on correlation of the security threat assessment with the security threat database.

Example 68 includes the subject matter of any of Examples 59-67, and wherein determining the remediation action comprises requesting a remediation determination from a remediation server; and receiving a remediation instruction associated with the remediation determination from the remediation server.

Example 69 includes the subject matter of any of Examples 59-68, and further including transmitting, by the security server, the remediation instruction to the computing device.

Example 70 includes a security server comprising a processor; and a memory having stored therein a plurality of instructions that when executed by the processor cause the security server to perform the method of any of Examples 59-69.

Example 71 includes one or more machine-readable storage media comprising a plurality of instructions stored thereon that, in response to execution by a security server, cause the security server to perform the method of any of Examples 59-69.

Example 72 includes a security server for distributed detection of security anomalies, the security server comprising means for establishing a trusted relationship with a computing device; means for receiving, from the computing device, a security threat assessment of one or more packets of at least one of an inter-virtual network function network or an inter-virtual network function component network of the computing device; and means for correlating the security threat assessment with a security threat database of the security server to determine whether the one or more packets pose a security threat.

Example 73 includes the subject matter of Example 72, and wherein the means for establishing the trusted relationship comprises means for establishing the trusted relationship with a corresponding trusted execution environment module of the computing device.

Example 74 includes the subject matter of any of Examples 72 and 73, and wherein the means for receiving the security threat assessment comprises means for receiving the security threat assessment from the corresponding trusted execution environment module of the computing device over an out-of-band communication channel established between the trusted execution environment module of the security server and the corresponding trusted execution environment module of the computing device.

Example 75 includes the subject matter of any of Examples 72-74, and wherein the means for establishing the trusted relationship comprises means for exchanging cryptographic keys with the computing device.

Example 76 includes the subject matter of any of Examples 72-75, and further including means for establishing a trusted tunnel with the computing device based on the trusted relationship.

Example 77 includes the subject matter of any of Examples 72-76, and wherein the means for establishing the trusted tunnel further comprises means for receiving a security policy of the computing device from the computing device.

Example 78 includes the subject matter of any of Examples 72-77, and wherein the means for establishing the trusted tunnel further comprises means for receiving heuristic code of the computing device from the computing device.

Example 79 includes the subject matter of any of Examples 72-78, and wherein the means for establishing the trusted tunnel further comprises means for transmitting heuristic code to the computing device.

Example 80 includes the subject matter of any of Examples 72-79, and further including means for determining a remediation action in response to identification of a security threat based on correlation of the security threat assessment with the security threat database.

Example 81 includes the subject matter of any of Examples 72-80, and wherein the means for determining the remediation action comprises means for requesting a remediation determination from a remediation server; and means for receiving a remediation instruction associated with the remediation determination from the remediation server.

Example 82 includes the subject matter of any of Examples 72-81, and further including means for transmitting the remediation instruction to the computing device.

The invention claimed is:

1. A computing device for distributed detection of security anomalies, the computing device comprising:
a memory;
a trusted execution environment module to (i) establish a trusted relationship with a security server, (ii) read, from a shared memory reserved by a hypervisor of the computing device, one or more packets of an inter-virtual network function component network that includes multiple components of a virtual network function distributed across the computing device and one or more other computing devices in response to establishment of the trusted relationship, and (iii) perform a security threat assessment of the one or more packets; and
a communication module to transmit the security threat assessment to the security server.

2. The computing device of claim 1, wherein to establish the trusted relationship comprises to establish the trusted relationship with a corresponding trusted execution environment module of the security server.

3. The computing device of claim 2, wherein to transmit the security threat assessment comprises to transmit the security threat assessment to the corresponding trusted execution environment module of the security server over an out-of-band communication channel established between the trusted execution environment module of the computing device and the corresponding trusted execution environment module of the security server.

4. The computing device of claim 1, wherein the trusted execution environment module is further to transmit a security policy of the computing device to the security server.

5. The computing device of claim 1, wherein the trusted execution environment module is further to transmit heuristic code of the computing device to the security server.

6. The computing device of claim 1, wherein the trusted execution environment module is further to receive heuristic code from the security server.

7. The computing device of claim 1, wherein the trusted execution environment module is further to boot the computing device in response to establishment of the trusted relationship.

8. The computing device of claim 7, wherein to boot the computing device comprises to retrieve a configuration policy of the computing device.

9. The computing device of claim 1, wherein the trusted execution environment module is further to determine a runtime posture of the computing device; and
wherein to perform the security threat assessment comprises to perform the security threat assessment of the one or more packets based on the runtime posture.

10. The computing device of claim 9, wherein to determine the runtime posture of the computing device comprises to determine a runtime posture of a virtual network function of the computing device.

11. The computing device of claim 1, wherein the communication module is further to receive a remediation action instruction for the one or more packets from the security server.

12. The computing device of claim 11, wherein the trusted execution environment module is further to enforce a remediation action corresponding with the remediation action instruction.

13. The computing device of claim 1, wherein the trusted execution environment module is further to:
perform the security threat assessment of a system that includes a plurality of servers; and
receive security information from a trusted execution environment of a second computing device that is to perform a security threat assessment of a subset of the system.

14. The computing device of claim 1, wherein to read the one or more packets by the hypervisor comprises to read the one or more packets from a virtual switch of the inter-virtual network function component network.

15. The computing device of claim 1, wherein the trusted execution module is further configured to read one or more fuses of the computing device to determine a security policy associated with enabling access to the computing device through microcode or a basic input output system (BIOS) of the computing device.

16. A method for distributed detection of security anomalies by a computing device, the method comprising:
establishing, by the computing device, a trusted relationship with a security server;
reading, by the computing device, from a shared memory reserved by a hypervisor of the computing device, one or more packets of an inter-virtual network function component network that includes multiple components of a virtual network function distributed across the computing device and one or more other computing devices in response to establishing the trusted relationship;

performing, by the computing device, a security threat assessment of the one or more packets; and transmitting, by the computing device, the security threat assessment to the security server.

17. The method of claim 16, wherein establishing the trusted relationship comprises establishing the trusted relationship with a corresponding trusted execution environment module of the security server.

18. The method of claim 17, wherein transmitting the security threat assessment comprises transmitting the security threat assessment to the corresponding trusted execution environment module of the security server over an out-of-band communication channel established between the trusted execution environment module of the computing device and the corresponding trusted execution environment module of the security server.

19. The method of claim 16, further comprising determining, by the computing device, a runtime posture of a virtual network function of the computing device; and wherein performing the security threat assessment comprises performing the security threat assessment of the one or more packets based on the runtime posture.

20. The method of claim 16, further comprising:

receiving, by the computing device, a remediation action instruction for the one or more packets from the security server; and enforcing, by the computing device, a remediation action corresponding with the remediation action instruction.

21. A security server for distributed detection of security anomalies, the security server comprising:

a memory;

a trusted execution environment module to establish a trusted relationship with a computing device; and a communication module to receive, from the computing device, a security threat assessment of one or more packets of an inter-virtual network function component network that includes multiple components of a virtual network function distributed across the computing device and one or more other computing devices;

wherein the trusted execution environment module is further to correlate the security threat assessment with a security threat database of the security server and simulate execution of the one or more packets based on a configuration of the computing device to determine whether the one or more packets pose a security threat.

22. The security server of claim 21, wherein to establish the trusted relationship comprises to establish the trusted relationship with a corresponding trusted execution environment module of the computing device; and wherein to receive the security threat assessment comprises to receive the security threat assessment from the corresponding trusted execution environment module of the computing device over an out-of-band communication channel established between the trusted execution environment module of the security server and the corresponding trusted execution environment module of the computing device.

23. The security server of claim 21, wherein the trusted execution environment module is further to establish a trusted tunnel with the computing device based on the trusted relationship.

24. The security server of claim 21, wherein the trusted execution environment module is further to determine a remediation action in response to identification of a security threat based on correlation of the security threat assessment with the security threat database.

25. The security server of claim 24, wherein to determine the remediation action comprises to:

request a remediation determination from a remediation server; and receive a remediation instruction associated with the remediation determination from the remediation server; and wherein the communication module is further to transmit the remediation instruction to the computing device.

* * * * *